United States Patent
Furuichi

(10) Patent No.: US 7,058,013 B2
(45) Date of Patent: Jun. 6, 2006

(54) HEADER CONVERSION TECHNIQUE IN ATM SWITCH

(75) Inventor: Hideyuki Furuichi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 987 days.

(21) Appl. No.: 09/829,972

(22) Filed: Apr. 11, 2001

(65) Prior Publication Data

US 2002/0024928 A1    Feb. 28, 2002

(30) Foreign Application Priority Data

Apr. 12, 2000    (JP) ............................. 2000-110352

(51) Int. Cl.
    H04L 12/28    (2006.01)
    H04L 12/26    (2006.01)

(52) U.S. Cl. ............ 370/228; 370/395.31; 370/395.32; 370/395.3; 370/392; 370/218; 370/219; 370/220; 370/227; 370/221; 370/225

(58) Field of Classification Search ................ 370/218, 370/219, 220, 221, 225, 227, 217, 395.1, 370/396, 397, 398, 399, 392, 228, 395.32, 370/395.31, 395.3, 389, 471
See application file for complete search history.

(56) References Cited

U.S. PATENT DOCUMENTS

| | | | |
|---|---|---|---|
| 5,414,701 A | 5/1995 | Shtayer et al. | |
| 5,600,630 A | 2/1997 | Takano et al. | |
| 5,764,624 A * | 6/1998 | Endo et al. | 370/218 |
| 6,075,767 A * | 6/2000 | Sakamoto et al. | 370/228 |
| 6,466,576 B1 * | 10/2002 | Sekine et al. | 370/395.1 |
| 6,856,594 B1 * | 2/2005 | Aihara et al. | 370/228 |

FOREIGN PATENT DOCUMENTS

| | | |
|---|---|---|
| DE | 198 37 126 | 2/2000 |
| JP | 7-74747 | 3/1995 |
| JP | A 7-264194 | 10/1995 |
| JP | A 8-204716 | 8/1996 |
| JP | A 8-242240 | 9/1996 |
| JP | A 9-27815 | 1/1997 |
| JP | A 9-64875 | 3/1997 |
| JP | 10-79747 | 3/1998 |
| JP | A 10-145374 | 5/1998 |
| JP | A 10-313317 | 11/1998 |
| JP | A 11-32052 | 2/1999 |
| JP | A 2000-49860 | 2/2000 |
| JP | A 2001-217844 | 8/2001 |

* cited by examiner

*Primary Examiner*—Wellington Chin
*Assistant Examiner*—Chuong Ho
(74) *Attorney, Agent, or Firm*—Harrity & Snyder LLP

(57) ABSTRACT

A header conversion device allowing reduced amount of hardware and memory and high-speed line switching is disclosed. In an ATM switching device having redundant incoming line systems, a header conversion table stores a set of header conversion information for one of the redundant incoming line systems. A header converter converts the header of an ATM cell received from each of the redundant incoming line systems by referring the same set of header conversion information.

21 Claims, 10 Drawing Sheets

HEADER CONVERSION TECHNIQUE IN ATM SWITCH

BACKGROUND OF THE INVENTION

1. Field of the Invention

The present invention generally relates to an ATM (asynchronous transfer mode) switching device capable of switching one of lines to another of the lines, and in particular to a header conversion technique for the line switching.

2. Description of the Related Art

In general, an ATM switching device having line protection capability is provided with a header converter and a header conversion table, which are used to switch a working line to a reserved line. More specifically, a plurality of line interfaces are connected to a multiplexer, which multiplexes incoming fixed-length packets (cells) received from the respective line interfaces to produce a sequence of cells each having the incoming line number thereof attached therewith. When receiving the sequence of cells from the multiplexer, the header converter reads the incoming line number and VPI/VCI (Virtual Path Identifier/Virtual Channel Identifier) for each cell and uses them as a key to search the header conversion table for output information necessary for a switch fabric to forward the cell to an appropriate output port thereof. The header converter converts the header of the cell using the found output information. Such output information includes an outgoing line number, outgoing routing information VPI/VCI, and control information for controlling the quality of service for each cell flow. The header conversion technique as described above has been disclosed in Japanese Patent Application Unexamined Publication Nos. 7-74747 and 10-79747.

In the case of redundant system architecture, however, two memory areas used for respective ones of working system and reserved system are needed to store the same information in the header conversion table, resulting in the increased amount of hardware and the increased amount of memory for header conversion table.

As shown in FIG. 1, for example, a 1+1 redundant system having #0 (working) and #1 (reserved) incoming lines includes a header conversion table storing necessary information for respective ones of #0 and #1 incoming lines. When the working line normally functions, the header converter accesses a set of information for the #0 incoming line to obtain necessary information for the switch fabric to forward the cell to an appropriate output port thereof. If the working line is switched to the reserved line due to occurrence of a failure on the #0 system, then a set of information to be accessed is changed from the #0 incoming line to the #1 incoming line.

Therefore, if the set of Information for the #0 incoming line is not identical to that for the #1 incoming line, then the line switching cannot be successfully performed. It is necessary to always store the same set of information for the #0 and #1 incoming lines in the header conversion table.

It is the same with the case of N:1 redundant system having N working incoming lines and a single reserved incoming line. In this case, it is further necessary to copy the latest information after a failure has occurred on the working incoming line to a memory area for the reserved incoming line. Since the table duplication is needed after the occurrence of a failure, it is not possible to perform the line switching immediately after the failure occurs and therefore the increased speed of line switching cannot be achieved.

SUMMARY OF THE INVENTION

An object of the present invention is to provide a header conversion method and device eliminating the need of information for a reserved system, allowing reduced amount of hardware and memory.

Another object of the present invention is to provide a header conversion method and device allowing high-speed line switching when a failure occurs.

According to the present invention, a device for converting a header of a packet to forward the packet to an appropriate one of output ports of a switch fabric, includes: redundant incoming line systems; a header conversion table storing a set of header conversion information for one of the redundant incoming line systems; and a header converter for converting a header of a packet received from each of the redundant incoming line systems by referring the set of header conversion information.

According to an aspect of the present invention, a device for converting a header of a packet to forward the packet to an appropriate one of output ports of a switch fabric, includes: at least one line interface; a reserved line interface corresponding to each of said at least one line interface; a selector for normally selecting a corresponding line interface to receive a packet stream and, when a failure occurs on a system corresponding to the corresponding line interface, selecting the reserved line interface to receive the packet stream: a header conversion table storing header conversion information for each of said at least one line interface; and a header converter for converting the header of a packet received from the reserved line interface selected by the selector by referring to the header conversion information for the corresponding line interface.

The at least one line interface and the reserved line interface have line numbers uniquely assigned thereto. A line number of each of said at least one line interface and the reserved line interface may be transferred to the header converter. The header converter may include: a line number converter for converting a line number of the reserved line interface to a line number of the corresponding line interface: and a controller for accessing the header conversion information for the corresponding line interface by using the line number of the corresponding line interface. When the reserved line interface is selected by the selector due to occurrence of the failure, the line number converter may convert the line number of the reserved line interface to the line number of the corresponding line interface.

According to another aspect of the present invention, a device for converting a header of a packet to forward the packet to an appropriate one of output ports of a switch fabric, includes: a plurality of line interfaces connected to respective ones of incoming lines; a reserved line interface; a first selector for connecting a selected one of the incoming lines to the reserved line interface when a failure occurs on a system corresponding to a corresponding line interface: a second selector for normally selecting each of the plurality of line interfaces and, when the failure occurs on the system corresponding to the corresponding line interface, selecting the reserved line interface in place of the corresponding line interface; a header conversion table storing header conversion information for each of the plurality of line interfaces; and a header converter for converting the header of a packet received from the reserved line interface selected by the second selector by referring to the header conversion information for the corresponding line interface.

DETAILED DESCRIPTION OF THE PREFERRED EMBODIMENTS

Figure 1:
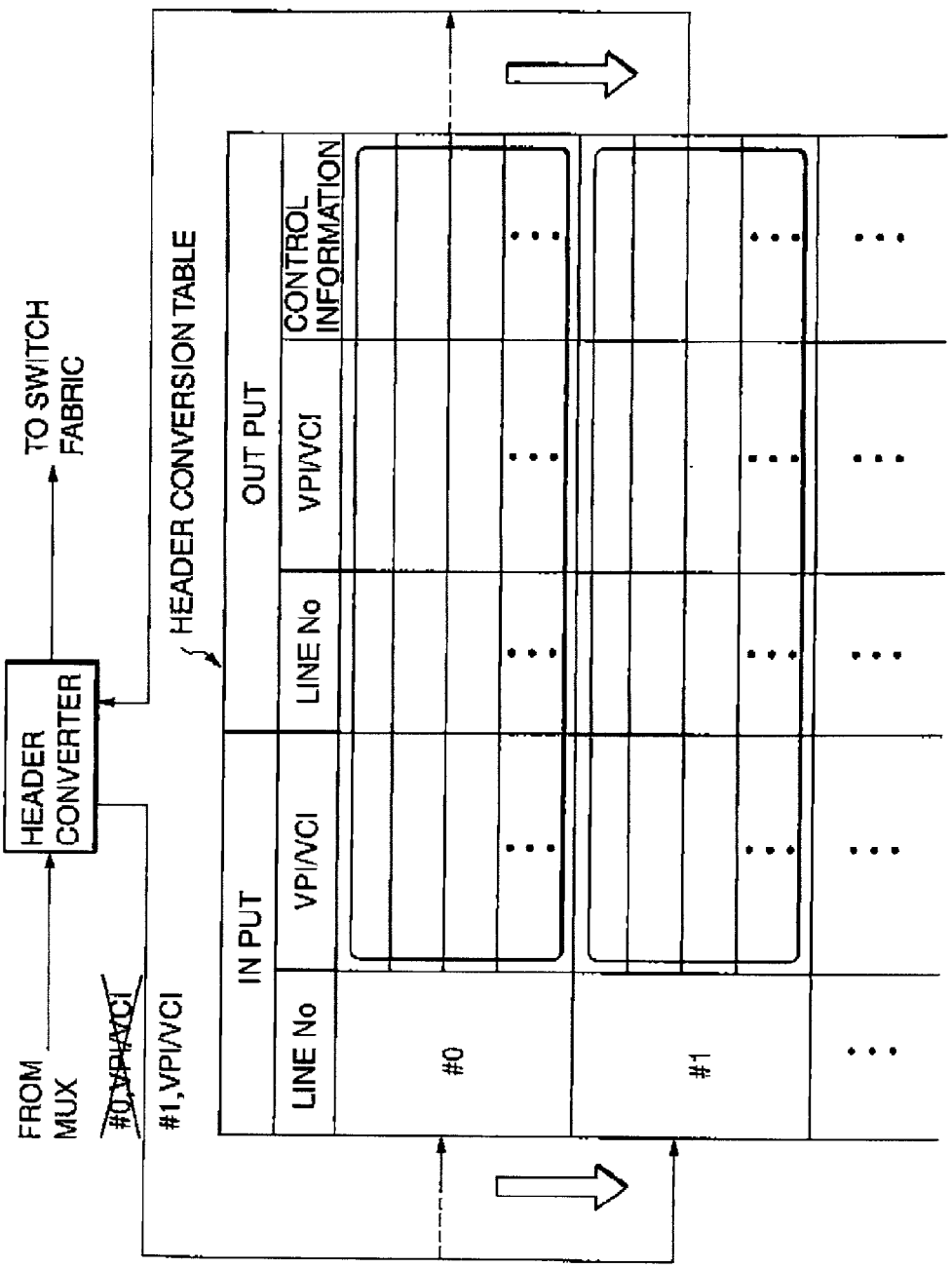
FIG. 1 is a schematic diagram showing a conventional header conversion method.
Figure 2:
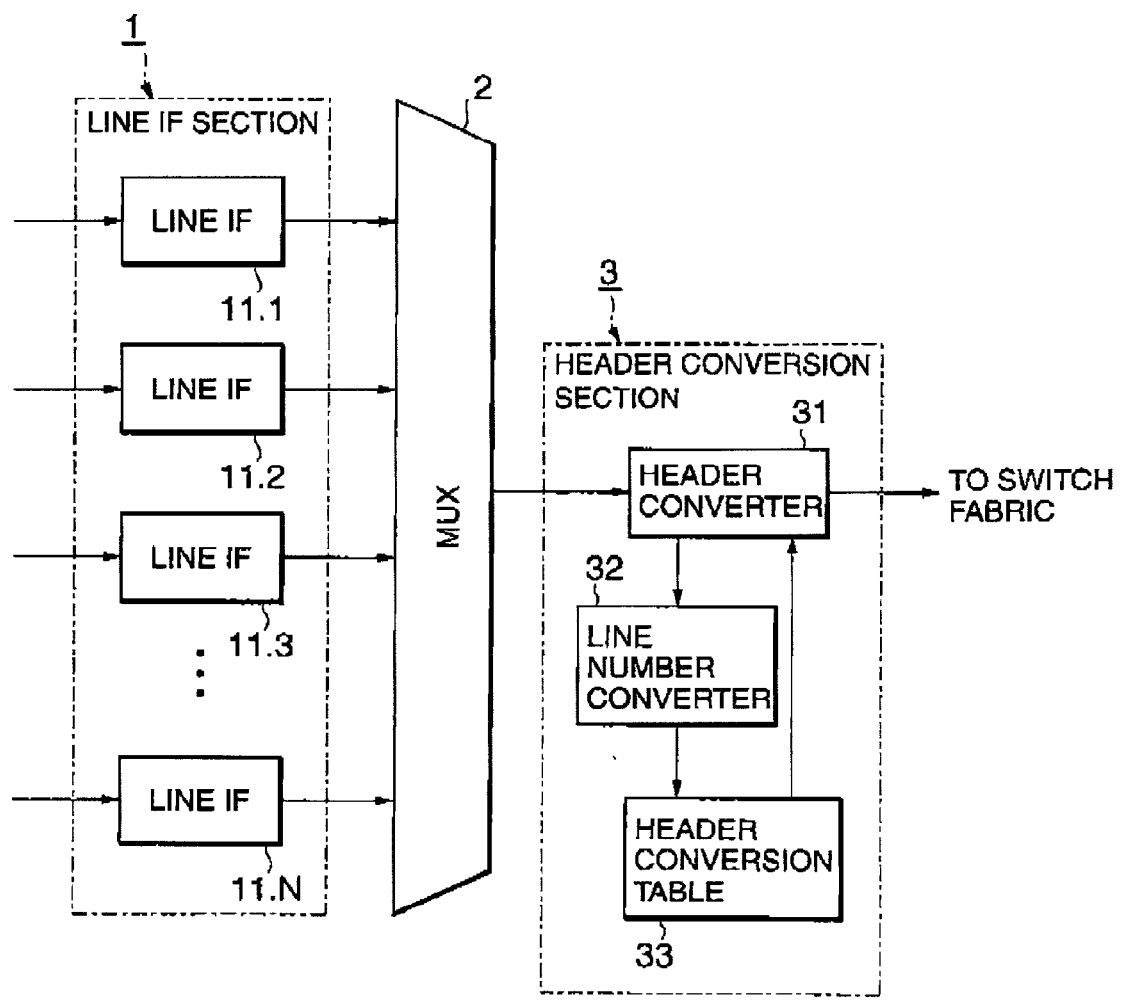
FIG. 2 is a block diagram showing an input stage of an ATM switching device employing a header conversion method according to a first embodiment of the present invention.

Referring to FIG. 2, an ATM switching device employing a header conversion circuit according to a first embodiment of the present invention is provided with a line interface section 1 accommodating N incoming lines.

The line interface section 1 includes N (N is an integer greater than 1) line interfaces 11.1 to 11.N, each of which is connected to a corresponding incoming line to receive data from another ATM switching device or a subscriber communication device. Further, the respective line interfaces 11.1 to 11.N have line numbers (here, #0 to #N-1) uniquely assigned thereto. A cell output of each of the line interfaces 11.1 to 11.N is connected to a multiplexer 2 and a sequence of cells multiplexed by the multiplexer 2 is output to a header conversion section 3. The header conversion section 3 includes a header converter 31, a line number converter 32, and a header conversion table 33.

The header converter 31 outputs the line number and the routing information VPI/VCI for each cell to the line number converter 32 and the header conversion table 33, respectively. The header converter 31 receives necessary information corresponding to the line number and the routing information from the header conversion table 33 and converts the header of each cell using the necessary information. The cell with converted header information is transferred to the switch fabric (not shown), in which the cell is forwarded to an appropriate output port of the switch fabric depending on the converted header information.

Figure 3:
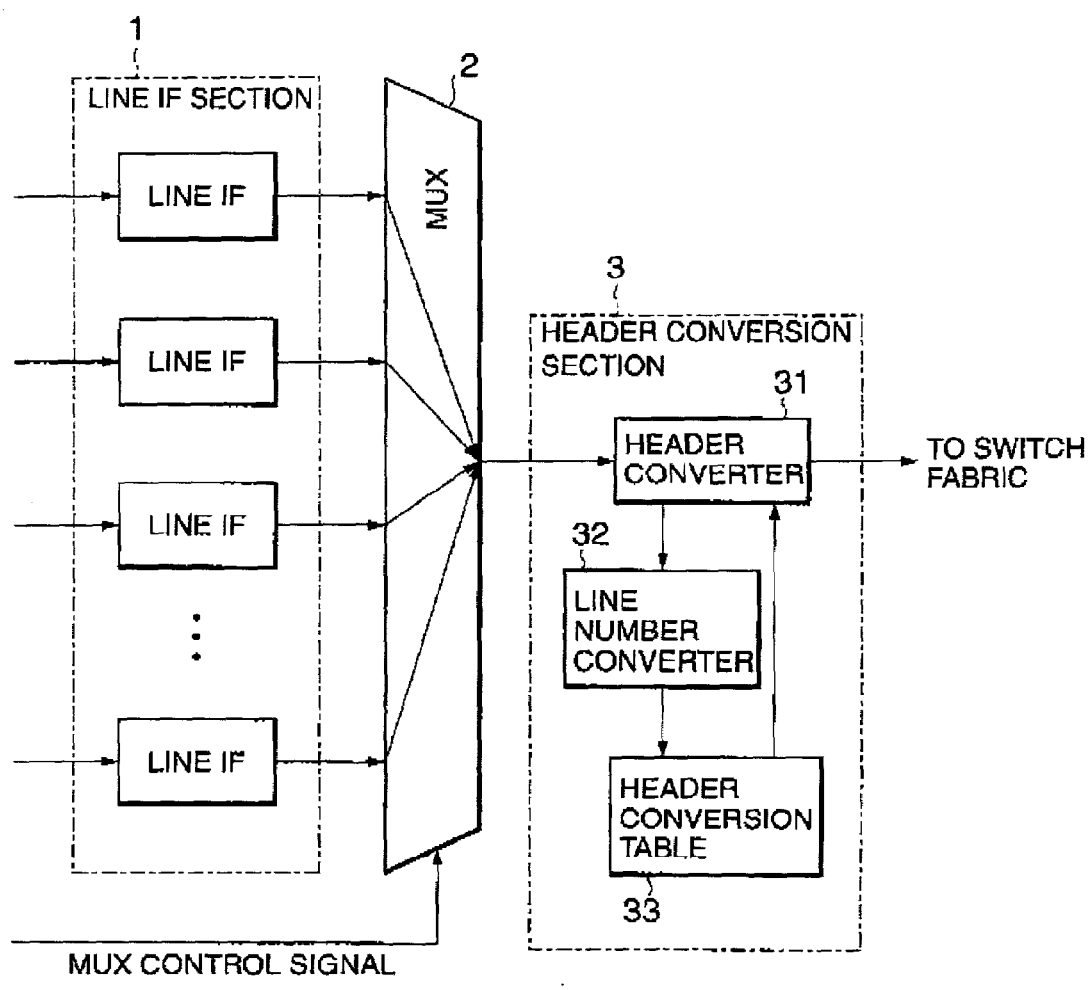
FIG. 3 is a block diagram showing the input stage of the ATM switching device of FIG. 2 for explanation of an operation of the first embodiment.

As shown in FIG. 3, the multiplexer 2 multiplexes incoming fixed-length packets (cells) received from the respective line interfaces 11.1 to 11.N according to a multiplexing control signal to produce a sequence of cells. The sequence of cells is output to the header converter 31 with each cell having the line number of a corresponding line interface at which the cell arrived.

When receiving the sequence of cells from the multiplexer 2, the header converter 31 reads the line number and routing information VPI/VCI for each cell and outputs the line number to the line number converter 32 and the routing information VPI/VCI to the header conversion table 33. A converted line number by the line number converter 32 is output to the header conversion table 33.

In the case of a redundant system, the line number converter 32 allows the line number to be converted to selected line number depending on a control signal. Since the system as shown in FIG. 2 has no redundant architecture, the line number converter 32 does not substantially convert the line number.

Figure 4:
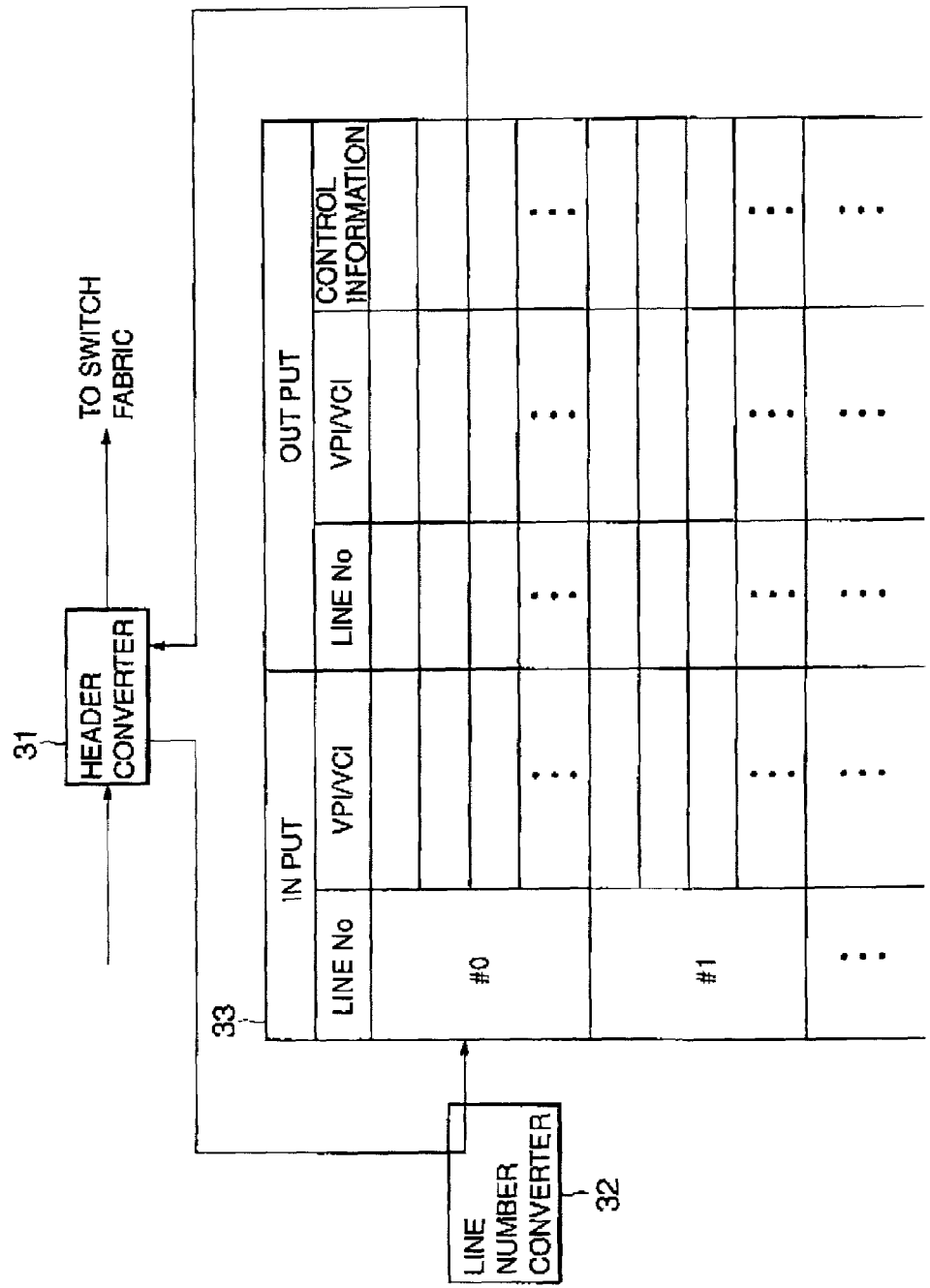
FIG. 4 is a schematic diagrams showing a header conversion method according to the first embodiment.

Referring to FIG. 4, the line number and the routing information VPI/VCI for each cell are used as a key to search the header conversion table 33. For example, when receiving a cell arriving at the line interface 11.1 having line number #0 assigned thereto, since the line number is not converted by the line number converter 32, the line number #0 and the routing information VPI/VCI of the cell are used as a key to search the header conversion table 33. When a match is found, the corresponding output information composed of an outgoing line number, outgoing routing information VPI/VCI, and control information is returned to the header converter 31. Using the output information returned from the header conversion table 33, the header converter 31 converts the header of the cell and outputs the cell with converted header to the switch fabric.

In general, the header conversion table 33 includes a decoder or CAM (Contents Addressable Memory) and a random access memory (RAM) storing output information. After the line number and the routing information VPI/VCI are converted to a memory address by the decoder or CAM, the output information stored in the RAM is accessed according to the memory address and is returned to the header converter 31.

1+1 Redundant system

Figure 5:
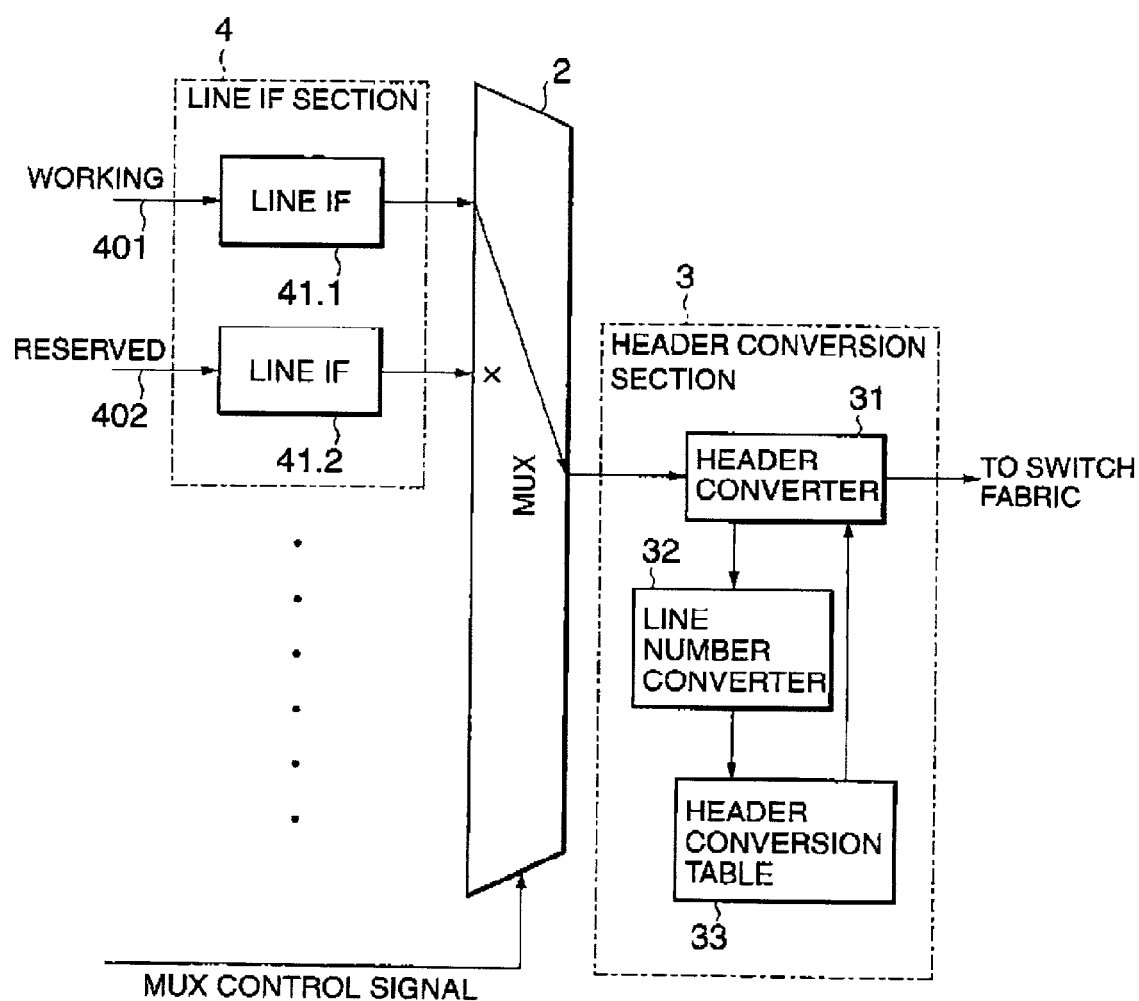
FIG. 5 is a block diagram showing an input stage of an ATM switching device employing a header conversion method according to a second embodiment of the present invention.

Referring to FIG. 5, an ATM switching device employing a header conversion circuit according to a second embodiment of the present invention has a 1+1 redundant architecture, in which circuit blocks similar to those previously described with reference to FIG. 2 are denoted by the same reference numerals.

A line interface section 4 accommodates a working line 401 and a reserved line 402, which are connected to a line interface 41.1 and a line interface 41.2, respectively. Here, line numbers #0 and #1 are assigned to the line interface 41.1 and the line interface 41.2, respectively. Plural line interface sections having the same circuit as the line interface section 4 may be connected to the multiplexer 2.

When normally operating, the same data is transferred on both the working line 401 and the reserved line 402. However, the multiplexer 2 multiplexes cells received from only working line interfaces to produce a sequence of cells according to a multiplex control signal. In such a normal condition, the operation of the header conversion section 3 is the sane as that in the first embodiment as shown in FIG. 4.

Figure 6:
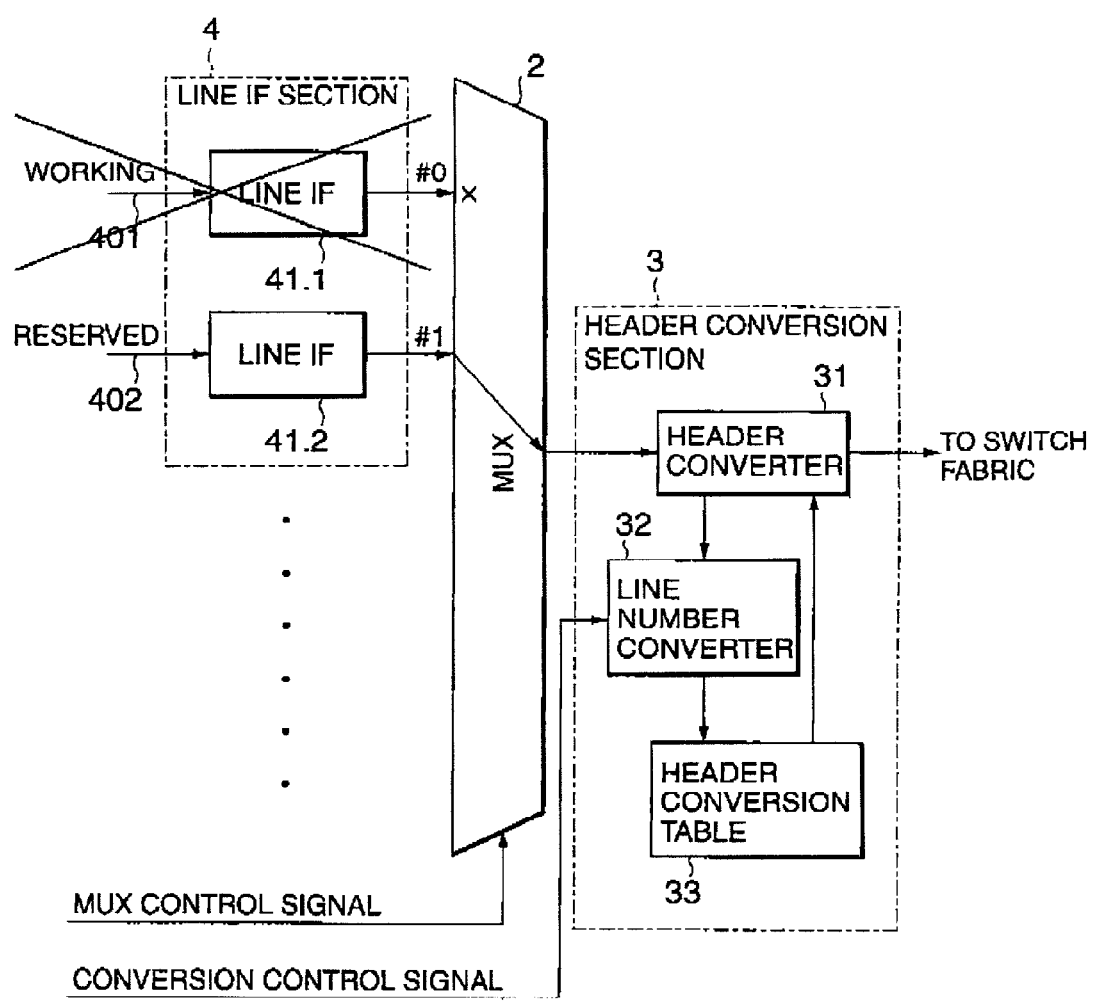
FIG. 6 is a block diagram showing the input stage of the ATM switching device of FIG. 5 for explanation of an operation of the second embodiment.

As shown in FIG. 6, in the event of a failure on the working line 401 or the line interface 41.1, the occurrence of the failure is detected by a well-known means and thereby the multiplex control signal is changed so as to control the multiplexer 2 such that cells received from the line interface 41.2 connected to the reserved line 402 are selected to be multiplexed. At the same time, the conversion control signal causes the line number converter 32 to switch the line number #1 to the line number #0.

Figure 7:
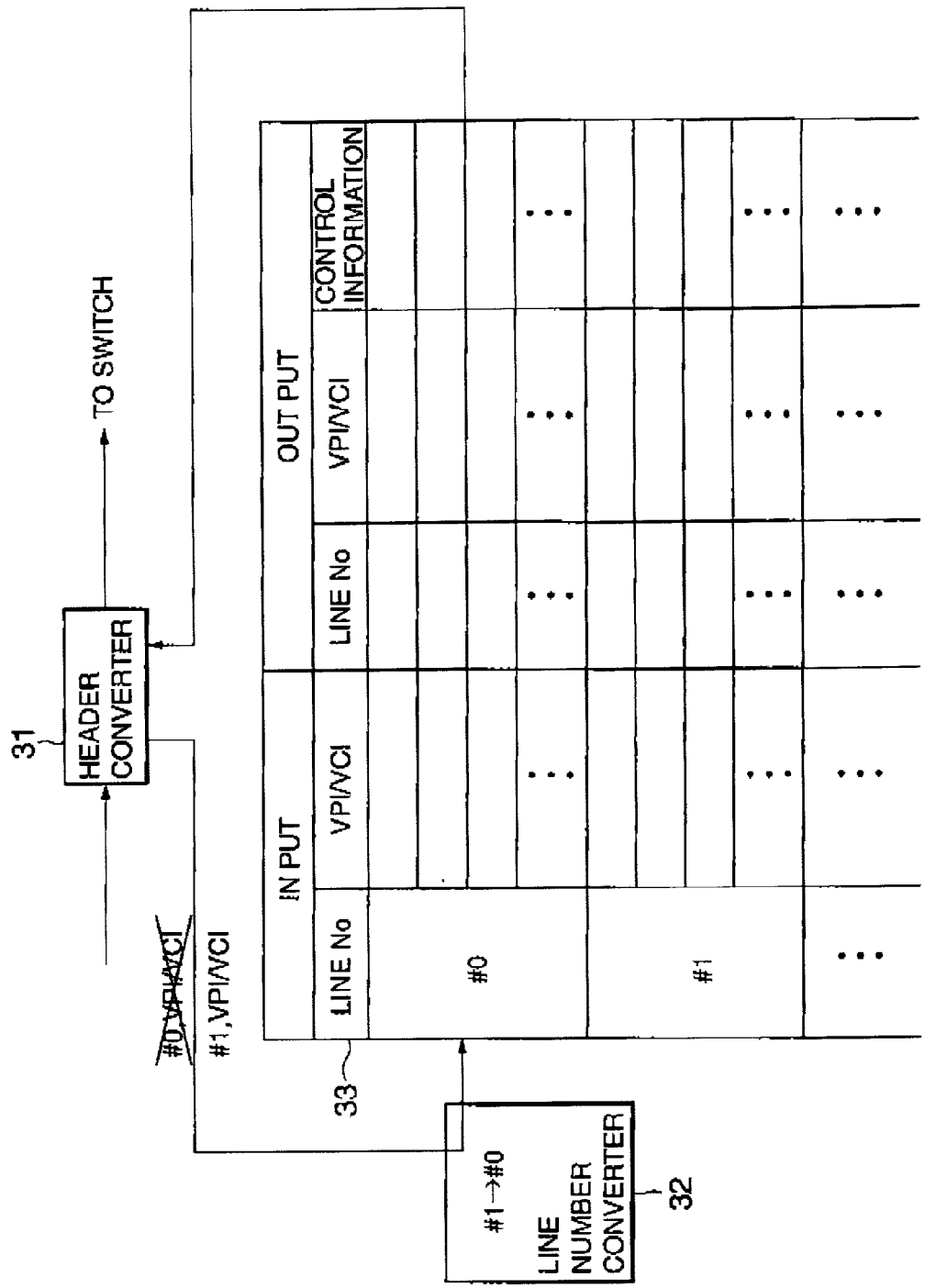
FIG. 7 is a schematic diagram showing a header conversion method according to the second embodiment.

Referring to FIG. 7, more specifically, when the multiplexer 2 switches an incoming route from the line interface 41.1 to the line interface 41.2 in response to the occurrence of the failure, cells output from the line interface 41.2 having the line number #1 assigned thereto are multiplexed and transferred to the header converter 31 together with the line number #1.

The header converter 31 reads the line number #1 and the routing information from each of the cells and outputs them to the line number converter 32 and the header conversion table 33. Since the line number converter 32 has been set to such a state that the working line number #1 is converted to the reserved line number #0, the output information corresponding to input information for the line number #0 is accessed and returned to the header converter 31. In other words, the header converter 31 can obtain the same output information as in the normal case from the header conversion table 33 after and before the failure on the working line 401 occurs. Accordingly, the cells on the reserved system can be transferred to the switch fabric as the case of the cells on the working system without the need of the installation of information for the reserved system in the header conversion table 33.

N:1 Redundant system

Figure 8:
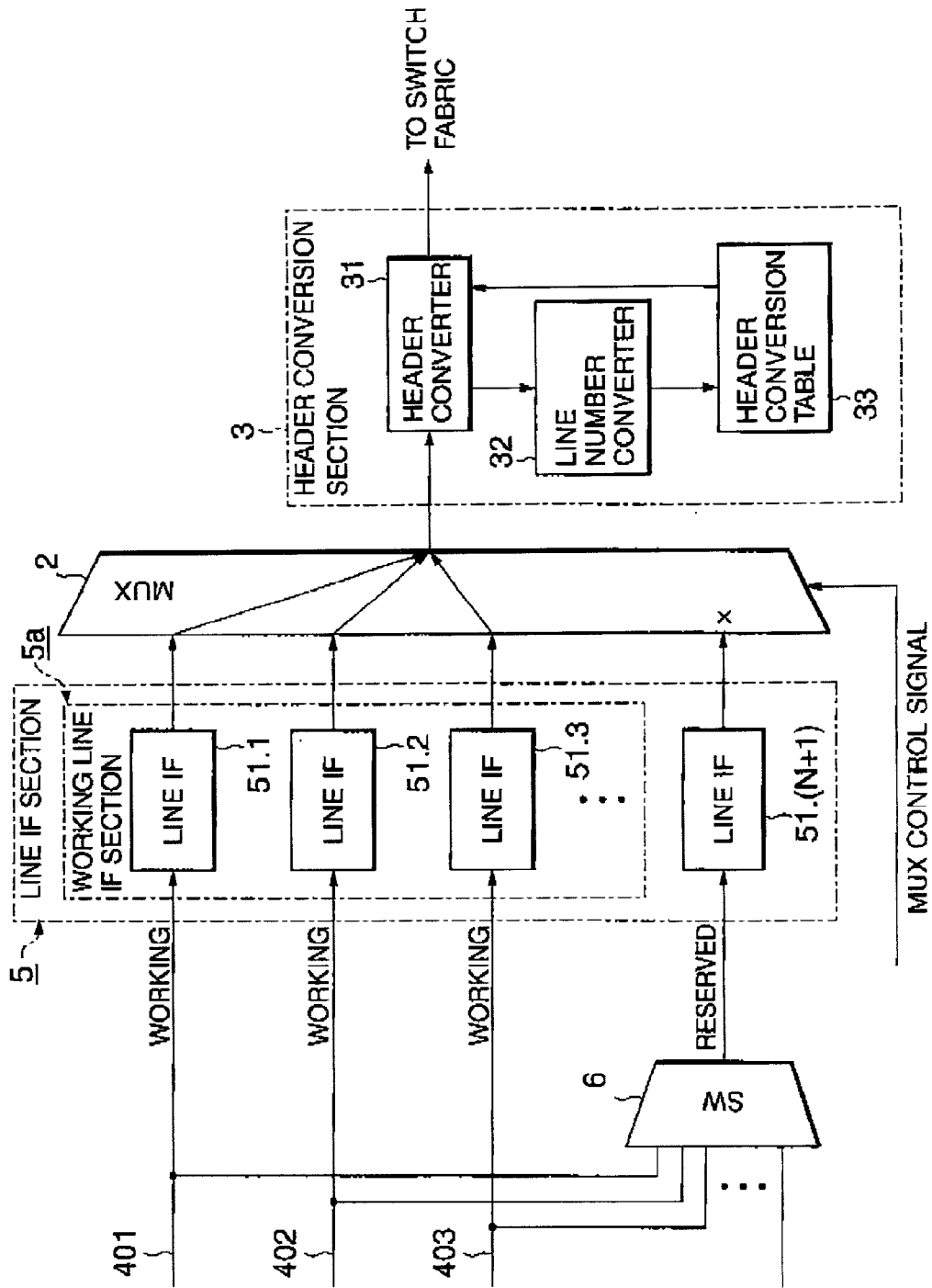
FIG. 8 is a block diagram showing an input stage of an ATM switching device employing a header conversion method according to a third embodiment of the present invention.

Referring to FIG. 8, an ATM switching device employing a header conversion circuit according to a third embodiment of the present invention has an N:1 redundant architecture, in which circuit blocks similar to those previously described with reference to FIG. 2 are denoted by the same reference numerals.

A line interface section 5 includes a working line interface section 5a composed of N working line interfaces 51.1 to 51.N corresponding to respective ones of N working lines 401, 402, 403, . . . and a reserved line interface 51.(N+1). Here, line numbers #0 to #N are assigned to the working line interfaces 51.1 to 51.N and the reserved line interface 51.(N+1), respectively.

In addition, a selector switch 6 is connected between the N working lines and the reserved line interface 51. (N+1). The selector switch 6 has N input ports connected to respective ones of the N working lines and one output port connected to the reserved line interface 51.(N+1). When one of the working line interfaces 51.1 to 51.N is faulty, the selector switch 6 is switched by a selection signal so that the reserved line interface 51.(N+1) is used in place of the fault line interface. The working and reserved line interfaces 51.1 to 51.(N+1) are connected to the multiplexer 2.

When normally operating, the multiplexer 2 multiplexes cells received from only working line interfaces 51.1 to 51.N to produce a sequence of cells according to a multiplex control signal. In such a normal condition, the operation of the header conversion section 3 is the same as that in the first embodiment as shown in FIG. 4.

Figure 9:
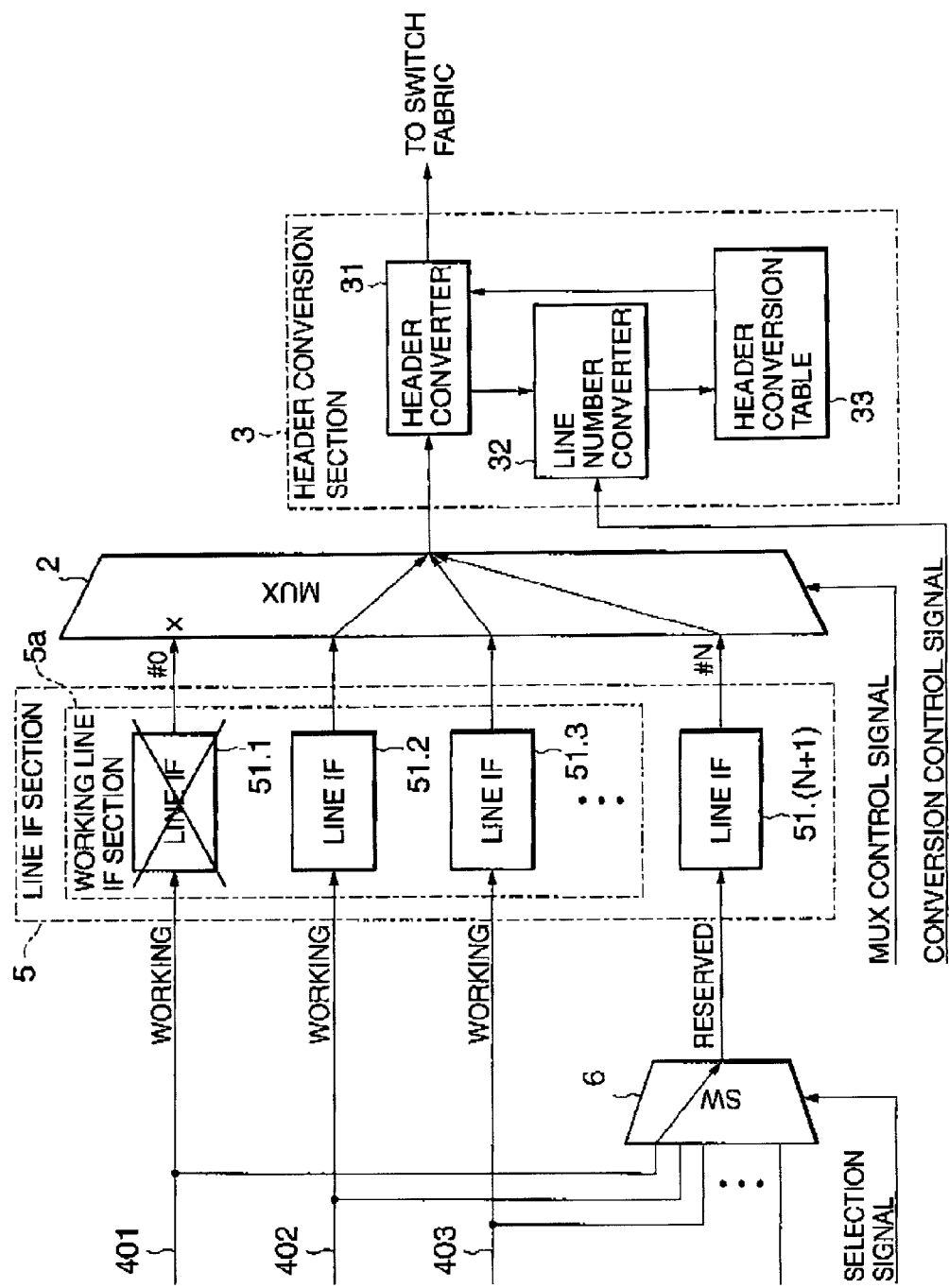
FIG. 9 is a block diagram showing the input stage of the ATM switching device of FIG. 8 for explanation of an operation of the third embodiment.

As shown in FIG. 9, in the event of a failure on the working line interface 51.1, the occurrence of the failure is detected by a well-known means because no cell is received from the working line interface 51.1. When the occurrence of the failure is detected on the working line interface 51.1, the selection signal is changed so as to connect the working line 401 corresponding to the fault line interface 51.1 to the reserved line interface 51.(N+1) and thereby incoming cells on the working line 401 are transferred to the reserved line interface 51 (N+1). Further the multiplex control signal is changed so as to control the multiplexer 2 such that cells received from the reserved line interface 51. (N+1) are selected to be multiplexed. At the same time, the conversion control signal causes the line number converter 32 to convert the line number #N to the line number #0.

Figure 10:
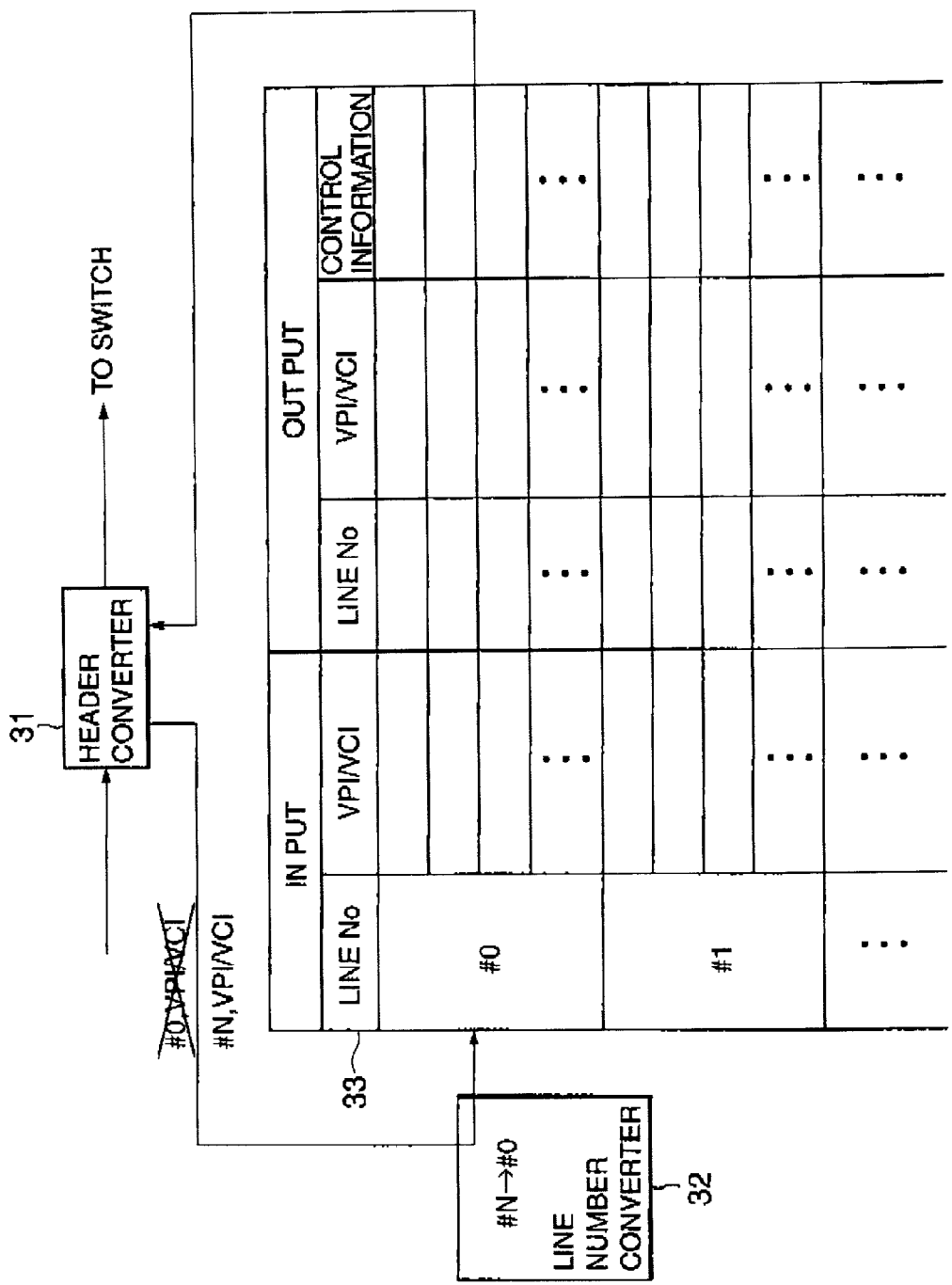
FIG. 10 is a schematic diagram showing a header conversion method according to the third embodiment.

Referring to FIG. 10, more specifically, when the multiplexer 2 switches an incoming route from the line interface 51.1 to the reserved line interface 51.(N+1) in response to the occurrence of the failure, cells output from the reserved line interface 51.(N+1) having the line number #N assigned thereto are multiplexed and transferred to the header converter 31 together with the line number #N.

The header converter 31 reads the line number #N and the routing information from each of the cells and outputs them to the line number converter 32 and the header conversion table 33. Since the line number converter 32 has been set to such a state that the line number #N is converted to the line number #0, the output information corresponding to input information for the line number #0 is accessed and returned to the header converter 31. In other words, the header converter 31 can obtain the same output information as in the normal case from the header conversion table 33 after and before the failure on the working line interface 51.1 occurs. Accordingly, the cells coming in on the working line 401 can be transferred to the switch fabric through the reserved line interface 51.(N+1) as the case of the cells on the working line interface 51.1 without the need of the installation of information for the reserved line interface 51.(N+1) in the header conversion table 33.

In the above embodiments, the line number converter 32 is provided in the header conversion section 3. Alternatively, it is possible to provide the line number converter 32 in the reserved line interface 41.2 or 51.(N+1) or the multiplexer 2. Further, it is possible to provide the line number converter 32 on the cell transfer line between the multiplexer 2 and the header conversion section 3.

As described above, there is no need of a conversion table used for a reserved line interface, resulting in the reduced size of a decoder or CAM for converting the routing information to a memory address and further the reduced amount of memory required for the header conversion table. This may promote miniaturization and achieve cost-reduction effectively.

Since the same table as the working header conversion table is accessed even if switching to the reserved line interface, the identical information can be obtained to convert the header information in both working and reserved systems. Accordingly, it can be avoided that the line switching cannot be successfully performed. Further, in the case of N:1 redundant system, there is no need of the installation of data duplicating means. Since data duplication is not needed, high-speed line switching can be achieved.

What is claimed is:

1. A device for converting a header of a packet to forward the packet to an appropriate one of output ports of a switch fabric, comprising:

at least one line interface;

a reserved line interface corresponding to each of said at least one line interface;

a selector for normally selecting a corresponding line interface to receive a packet stream and, when a failure occurs on a system corresponding to the corresponding line interface, selecting the reserved line interface to receive the packet stream;

a header conversion table storing header conversion information for each of said at least one line interface; and a header converter for converting the header of a packet received from the reserved line interface selected by the selector by referring to the header conversion information for the corresponding line interface.

2. The device according to claim 1, wherein said at least one line interface and the reserved line interface have line numbers uniquely assigned thereto, wherein a line number of each of said at least one line interface and the reserved line interface is transferred to the header converter, wherein the header converter comprises:

a line number converter for converting a line number of the reserved line interface to a line number of the corresponding line interface; and a controller for accessing the header conversion information for the corresponding line interface by using the line number of the corresponding line interface.

3. The device according to claim 2, wherein, when the reserved line interface is selected by the selector due to occurrence of the failure, the line number converter converts the line number of the reserved line interface to the line number of the corresponding line interface.

4. The device according to claim 1, wherein the selector is a multiplexer for multiplexing selected outputs of said at least one line interface and the reserved line interface to produce a sequence of packets, which is transferred to the header converter.

5. The device according to claim 4, wherein the multiplexer transfers a line number of each of said at least one line interface and the reserved line interface to the header converter.

6. The device according to claim 1, wherein the switch fabric is an ATM (asynchronous transfer mode) switching device and the packet is an ATM cell.

7. A device for converting a header of a packet to forward the packet to an appropriate one of output ports of a switch fabric, comprising;

a plurality of line interfaces connected to respective ones of incoming lines;

a reserved line interface;

a first selector for connecting a selected one of the incoming lines to the reserved line interface when a failure occurs on a system corresponding to a corresponding line interface;

a second selector for normally selecting each of the plurality of line interfaces and, when the failure occurs on the system corresponding to the corresponding line interface, selecting the reserved line interface in place of the corresponding line interface;

a header conversion table storing header conversion information for each of the plurality of line interfaces; and a header converter for converting the header of a packet received from the reserved line interface selected by the second selector by referring to the header conversion information for the corresponding line interface.

8. The device according to claim 7, wherein the plurality of line interfaces and the reserved line interface have line numbers uniquely assigned thereto, wherein a line number of each of the plurality of line interfaces and the reserved line interface is transferred to the header converter, wherein the header converter comprises:

a line number converter for converting a line number of the reserved line interface to a line number of the corresponding line interface; and a controller for accessing the header conversion information for the corresponding line interface by using the line number of the corresponding line interface.

9. The device according to claim 8, wherein, when the reserved line interface is selected by the second selector due to occurrence of the failure, the line number converter converts the line number of the reserved line interface to the line number of the corresponding line interface.

10. The device according to claim 7, wherein the second selector is a multiplexer for multiplexing selected outputs of the plurality of line interfaces and the reserved line interface to produce a sequence of packets, which is transferred to the header converter.

11. The device according to claim 10, wherein the multiplexer transfers a line number of each of the plurality of line interfaces and the reserved line interface to the header converter.

12. The device according to claim 7, wherein the switch fabric is an ATM (asynchronous transfer mode) switching device and the packet is an ATM cell.

13. A method for converting a header of a packet to forward the packet to an appropriate one of output ports of a switch fabric in an ATM (asynchronous transfer mode) switching device having at least on line interfaces and a reserve line interface corresponding to each of said at least one line interface, comprising:

normally selecting a corresponding line interface receive a packet steam;

when a failure occurs on a system corresponding to the corresponding line interface, selecting the reserved line interface to receive the packet steam;

storing header conversion information for each of said at least one line interface; and converting the header of a pocket received from the reserved line interface by referring to the header conversion information for the corresponding line interface.

14. The method according to claim 13, wherein said at least one line interface and the reserved line interface have line numbers uniquely assigned thereto, wherein the converting the header comprises:

receiving a line number of each of said at least one line interface and the reserved line interface;

converting a line number of the reserved line interface to a line number of the corresponding line interface; and accessing the header conversion information for the corresponding line interface by using the line number of the corresponding line interface.

15. A method for converting a header of a packet to forward the packet to an appropriate one of output ports of a switch fabric in an ATM (asynchronous transfer mode) switching device having a plurality of line interfaces connected to respective ones of incoming lines and a reserved line interface, comprising:

connecting a selected one of the incoming lines to the reserved line interface when a failure occurs on a system corresponding to a corresponding line interface;

normally selecting each of the plurality of line interfaces;

when the failure occurs on the system corresponding to the corresponding line interface, selecting the reserved line interface in place of the corresponding line interface;

storing header conversion information for each of the plurality of line interfaces; and converting the header of a packet received from the reserved line interface by referring to the header conversion information for the corresponding line interface.

16. A network device including a line interface and a redundant line interface corresponding to the line interface, the network device comprising:
   a header conversion table configured to store header conversion information for the line interface; and
   a header converter configured to cause the header conversion information for the line interface to be accessed in response to receiving information from the redundant line interface.

17. The network device of claim 16 wherein the header conversion table is not configured to store header conversion information for the redundant line interface.

18. The network device of claim 16 wherein the line interface and the redundant line interface are associated with unique line numbers, and
   wherein, when causing the header conversion information for the line interface to be accessed in response to receiving information from the redundant line interface, the header converter is configured to:
      convert the line number associated with the redundant line interface to the line number associated with the line interface.

19. The network device of claim 18 wherein the header converter is configured to:
   access the header conversion information for the line interface using the line number associated with the line interface.

20. A network device comprising:
   a first line interface configured to receive a stream of packets;
   a second line interface configured to serve as a backup to the first line interface; and
   a header converter configured to receive a packet from the second line interface and convert a header of the packet to appear as if the packet was received from the first line interface.

21. The network device of claim 20 wherein the first line interface is associated with a first line number and the second line interface is associated with a second line number, and
   wherein, when converting a header of the packet to appear as if the packet was received from the first line interface, the header converter is configured to:
      convert the second line number to the first line number.

* * * * *